(12) United States Patent
Kjær et al.

(10) Patent No.: US 10,359,026 B2
(45) Date of Patent: Jul. 23, 2019

(54) POWER OUTPUT CHANGES BY RAMPING DE-RATED POWER OUTPUT AND DE-RATED ROTOR SPEED

(71) Applicant: Vestas Wind Systems A/S, Aarhus N. (DK)

(72) Inventors: Martin Ansbjerg Kjær, Harlev J. (DK); Eik Herbsleb, Odder (DK); Martin Møller Sørensen, Aarhus C (DK); Jesper Sandberg Thomsen, Hadsten (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/761,549

(22) PCT Filed: Sep. 20, 2016

(86) PCT No.: PCT/DK2016/050302
§ 371 (c)(1),
(2) Date: Mar. 20, 2018

(87) PCT Pub. No.: WO2017/050338
PCT Pub. Date: Mar. 30, 2017

(65) Prior Publication Data
US 2019/0055924 A1    Feb. 21, 2019

(30) Foreign Application Priority Data
Sep. 22, 2015   (DK) .................. 2015 70605

(51) Int. Cl.
*F03D 7/02*  (2006.01)
*F03D 1/06*  (2006.01)
*F03D 7/04*  (2006.01)

(52) U.S. Cl.
CPC ......... *F03D 7/0276* (2013.01); *F03D 1/0675* (2013.01); *F03D 7/028* (2013.01);
(Continued)

(58) Field of Classification Search
CPC ........ F05B 2270/1033; F05B 2270/309; F05B 2270/32; F05B 2270/327; Y02E 10/723;
(Continued)

(56) References Cited

U.S. PATENT DOCUMENTS

2010/0283246 A1* 11/2010 Christensen .......... F03D 7/0292
290/44
2010/0286835 A1* 11/2010 Nyborg ................ F03D 7/0224
700/287

(Continued)

FOREIGN PATENT DOCUMENTS

CN    102852716 A    1/2013
CN    103762911 A    4/2014
(Continued)

OTHER PUBLICATIONS

Chinese Patent Office, Office Action in CN Application No. 201680055133.6, dated Mar. 4, 2019.
(Continued)

*Primary Examiner* — Charles Reid, Jr.
(74) *Attorney, Agent, or Firm* — Wood Herron & Evans LLP

(57) ABSTRACT

A method and associated control arrangement are disclosed for controlling a de-rated power output of a wind turbine generator, where the wind turbine generator is associated with a predetermined power ramp rate upper limit and operating with a de-rated rotor speed. The method includes ramping the power output from an initial power level to a target power level during a ramping interval. During a first portion of the ramping interval, the power output is ramped
(Continued)

at a first power ramp rate less than the power ramp rate upper limit. The method further includes ramping the rotor speed to a predetermined rotor speed value contemporaneously with ramping the power output during the first portion of the ramping interval. The first power ramp rate is determined such that a difference between the power output and the target power level is monotonically decreasing during the entirety of the ramping interval.

14 Claims, 7 Drawing Sheets

(52) U.S. Cl.
CPC ........... *F03D 7/0212* (2013.01); *F03D 7/048* (2013.01); *F05B 2270/1033* (2013.01); *F05B 2270/309* (2013.01); *F05B 2270/32* (2013.01); *F05B 2270/327* (2013.01); *Y02E 10/723* (2013.01)

(58) Field of Classification Search
CPC ...... F03D 1/0675; F03D 7/0212; F03D 7/028; F03D 7/048; F03D 7/0276
USPC ...................................................... 290/44, 55
See application file for complete search history.

(56) References Cited

U.S. PATENT DOCUMENTS

| 2013/0119663 A1* | 5/2013 | Birk .......................... F03D 7/02 |
| | | 290/44 |
| 2015/0115608 A1* | 4/2015 | Draper .................... F03D 7/028 |
| | | 290/44 |
| 2015/0159625 A1* | 6/2015 | Hardwicke, Jr. ..... F03D 7/0272 |
| | | 290/44 |

FOREIGN PATENT DOCUMENTS

| EP | 2434147 A1 | 3/2012 | |
| JP | 2014526227 A | 10/2014 | |
| WO | 2010000648 A2 | 1/2010 | |
| WO | 2011000531 A2 | 1/2011 | |
| WO | WO-2014026688 A1 * | 2/2014 | ........... F03D 7/0224 |
| WO | 2015078478 A1 | 6/2015 | |
| WO | 2015135549 A1 | 9/2015 | |

OTHER PUBLICATIONS

Danish Patent and Trademark Office, Search and Examination Report in PA 2015 70605, dated May 11, 2016.
European Patent Office, International Search Report and Written Opinion in PCT Application Serial No. PCT/DK2016/050302, dated Nov. 23, 2016.

* cited by examiner

POWER OUTPUT CHANGES BY RAMPING DE-RATED POWER OUTPUT AND DE-RATED ROTOR SPEED

BACKGROUND

Field of the Invention

Embodiments presented in this disclosure generally relate to techniques for fast power ramping for wind turbine generators operating with a de-rated power output and a de-rated rotor speed.

Description of the Related Art

Modern power generation and distribution networks increasingly rely on renewable energy sources, such as wind turbine generators. In some cases, the wind turbine generators may be substituted for conventional, fossil fuel-based generators. Beyond merely generating and delivering electrical power, the wind turbine generators are responsible for contributing to grid stability through frequency regulation. However, natural variations in wind conditions can affect the ability of wind turbines to predictably deliver power and regulate grid frequency. Additionally, wind conditions at times may be unsuitable for generating power.

SUMMARY

One embodiment of the present disclosure is a method and associated control arrangement for controlling a de-rated power output of a wind turbine generator, where the wind turbine generator is associated with a predetermined power ramp rate upper limit and operating with a de-rated rotor speed. The method includes ramping, upon receiving a target power level, the power output from an initial power level to the target power level during a ramping interval. During a first portion of the ramping interval, the power output is ramped at a first power ramp rate less than the power ramp rate upper limit. The method further includes ramping the rotor speed to a predetermined rotor speed value contemporaneously with ramping the power output during the first portion of the ramping interval. The first power ramp rate is determined such that a difference between the power output and the target power level is monotonically decreasing during the entirety of the ramping interval.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
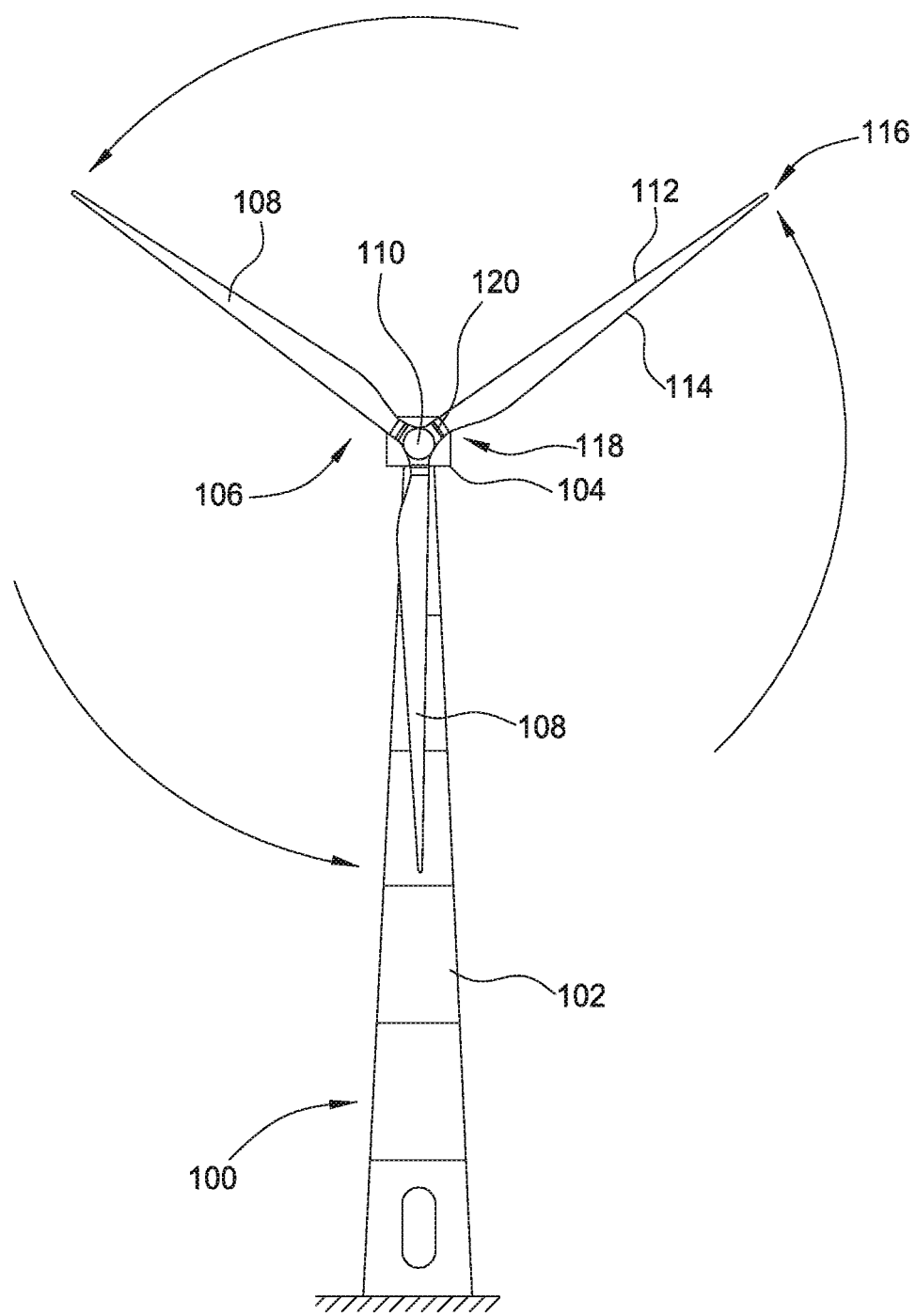
FIG. 1 illustrates a diagrammatic view of a horizontal-axis wind turbine, according to one embodiment.

Grid codes increasingly require the ability of connected wind turbines, often referred to as wind turbine generators (WTGs), to provide a fast power ramping capability, presenting several significant challenges for WTG design and operation. For example, grid codes may require fast ramping from a de-rated power level, e.g., as low as 10-12% of rated power or lower, where supported by current wind conditions. Operating at low power levels is generally challenging for WTGs. The power produced by a WTG is related to its torque and rotational speed according to:

$$P = \tau \times \omega \qquad (1)$$

where P represents power, $\tau$ represents torque, and w represents rotational speed. During low power operation of a WTG, changes in wind speed (e.g., which affect the value of $\omega$) result in changes to torque for cases where the converter maintains a steady power production level. If the torque value decreases below zero, a gear-torque-reversal event can result, harming the gearbox and reducing its operational lifetime. Generally, to prevent gear-torque-reversals during low power operation of a WTG, the rotor speed is reduced while the average torque level is raised for a given power level.

At low power levels, the blades of the de-rated WTG are pitched out in order to allow most of the wind to pass through the blades with minimal energy loss. When the WTG is subsequently instructed to perform a fast power ramping from the low power level, the WTG blades are pitched towards an optimal blade angle for the current rotational speed. However, because the rotational speed associated with the low power level is significantly less than what is aerodynamically optimal (based on the current wind conditions), the rotor cannot deliver the requested power level when reaching the optimal blade angle. Ultimately, the WTG reaches a limit to its power production capability, so as more power is drawn from the rotor for the fast power ramping, the rotational speed of the rotor is decreased. As a result, the WTG controller reduces loading on the WTG (e.g., operating the WTG in a distinct partial-load operation mode), halting the power ramping process so that the rotational speed of the rotor can be recovered. During reduced loading operation, the power output is first reduced while the rotor is accelerated to its rated value, then the power output is slowly ramped to the target power value. As the rotor speed increases, the aerodynamic efficiency of the WTG is gradually improved. While the target power level is ultimately reached by the WTG, in many cases the ramping interval (i.e., time) to reach the target power level is too long and does not meet grid code requirements and/or the requested power production.

One possible solution for power ramping to the target power level without decreasing the power output and/or entering a reduced loading operation is increasing the rotational speed of the rotor in anticipation of receiving a fast ramping command. However, such a scheme introduces additional wear on the gearbox and may be a relatively inefficient process.

Generally, embodiments of the disclosure are directed to techniques for providing fast power ramping of WTGs operating with a de-rated power output and a de-rated rotor speed to a target power level. De-rated power and de-rated rotor speed refer to operating the WTG at less than the corresponding rated capability for any number of reasons. In some cases, de-rated operation of WTGs is performed in order to meet grid code requirements, despite wind conditions being favorable for additional power production. In some embodiments, during a first portion of the ramping interval, the power output is ramped at a power ramp rate less than a power ramp rate upper limit for the WTG. At least some of the energy conserved by power ramping at the reduced power ramp rate is used to contemporaneously increase the rotor speed and to thereby increase the aerodynamic efficiency of the WTG. Using the techniques discussed herein, the WTG is able to provide fast power ramping with consistent power increases toward the target power level without having to enter reduced loading operation.

In some embodiments, the control arrangement for the WTG determines a minimum rotor speed value that is needed to meet the target power level, which may be based on measurements of current wind conditions at the WTG. During the first portion of the ramping interval, the rotor speed is increased to the minimum rotor speed value, while power output is ramped with a reduced power ramp rate. In some cases, the reduced power ramp rate may be substantially zero during the first portion. Upon reaching the minimum rotor speed value, the power output is ramped at a greater power ramp rate.

In some embodiments, the control arrangement provides an initial fast power ramping to a predetermined first intermediate power level before the first portion of the ramping interval, in which the power output is ramped at a reduced power ramp rate. During the first portion of the ramping interval, the rotor speed is contemporaneously ramped up to a predetermined rotor speed value. In some embodiments, the power output is ramped during the first portion from the first intermediate power level to a predetermined second intermediate power level, and the power output is ramped thereafter to the target power level from the second intermediate power level.

FIG. 1 illustrates a diagrammatic view of a horizontal-axis wind turbine 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

Figure 2:
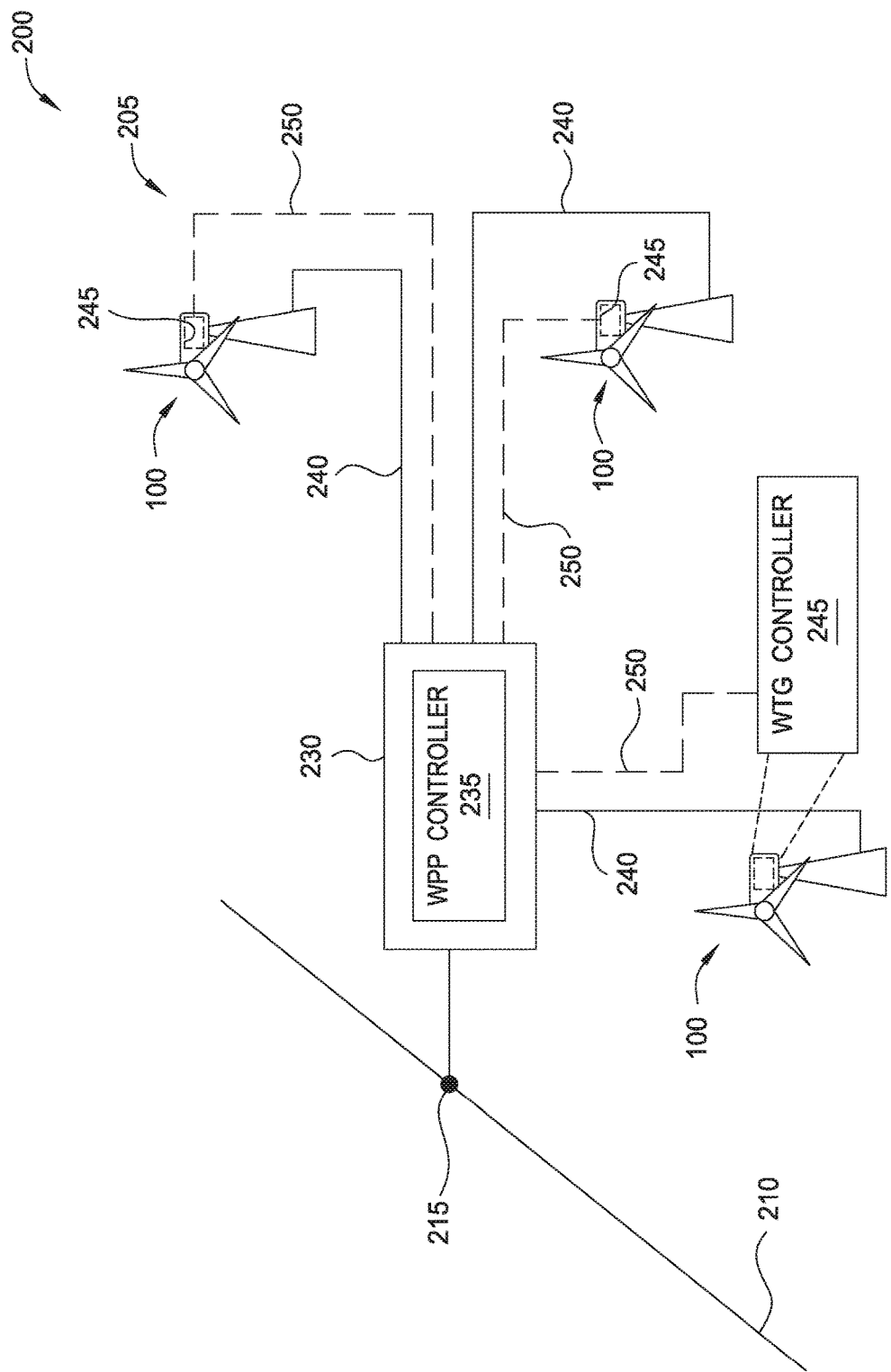
FIG. 2 illustrates a wind power plant operatively connected with an electrical grid, according to one embodiment.

For some embodiments, the blades 108 may be connected to the hub 110 using pitch bearings 120 such that each blade 108 may be rotated around its longitudinal axis to adjust the blade's pitch. FIG. 2 illustrates a wind power plant operatively connected with an electrical grid, according to one embodiment. In general, a wind power plant may also be referred to as a wind farm or wind park. In the depicted arrangement 200, a wind power plant 205 includes a plurality of wind turbines 100 operatively connected with an electrical grid 210 at a point of common coupling (or PCC) 215. In some embodiments, the wind turbines 100 of the wind power plant 205 are coupled with a substation 230 that includes a wind power plant controller (PPC) 235. In this case, the output from the substation 230 is coupled with electrical grid 210, and the electrical power generated by the wind turbines 100 is carried on one or more connections 240 to the substation 230. In an alternate embodiment, the wind power plant controller is located at an alternate location within the arrangement 200, such as with one of the wind turbines 100. In an alternate embodiment, one or more wind turbines 100 may deliver electrical power directly to the electrical grid 210 without being grouped and/or directed through the substation 230. The wind power plant controller 235 is communicatively coupled with each of the wind turbines 100 (e.g., with a respective wind turbine-level controller 245) through one or more connections 250.

The electrical grid 210 represents any suitable electrical transmission and/or distribution grids, which may be operated at one or more voltages. The electrical grid 210 generally includes a number of transmission lines, transformers, substations, etc.

Generally, differences in the amount of electrical power generated (e.g., produced by the wind power plant 205 and by the other generation facilities) and the amount of electrical power demanded by loads (e.g., loads) on an electrical grid cause the grid frequency to deviate from its prescribed or nominal value. Typical values of nominal grid frequency are 60 hertz (Hz) in the US and 50 Hz in Europe. One example of grid frequency deviation occurs when power demand exceeds the power generated—the difference in power can be drawn from the kinetic energy of the wind turbine generator, causing the wind turbine rotor (e.g., rotor 106 of FIG. 1) to slow down and the grid frequency to decrease accordingly. Conversely, when power generation exceeds the amount of power demand, the grid frequency may increase. In some cases, the wind turbine generators may be configured to operate within a predetermined frequency range, such as ±1% of the nominal grid frequency, before disconnecting or performing other regulation procedures to restore the grid frequency to within the predetermined frequency range.

Each wind turbine (WTG) 100 includes an electrical generator (not shown) configured to convert the mechanical energy of the wind turbine rotor 106 into one or more phases of electrical power, which is ultimately delivered to the electrical grid 210 and the loads connected thereto. In various embodiments, the wind turbine generators produce electrical power based on control signals provided by the wind power plant controller 235 and/or wind turbine generator controllers 245. The electrical generators may also provide feedback signals and other information to the wind power plant controller 235 using the connections 240, 250.

Figure 3:
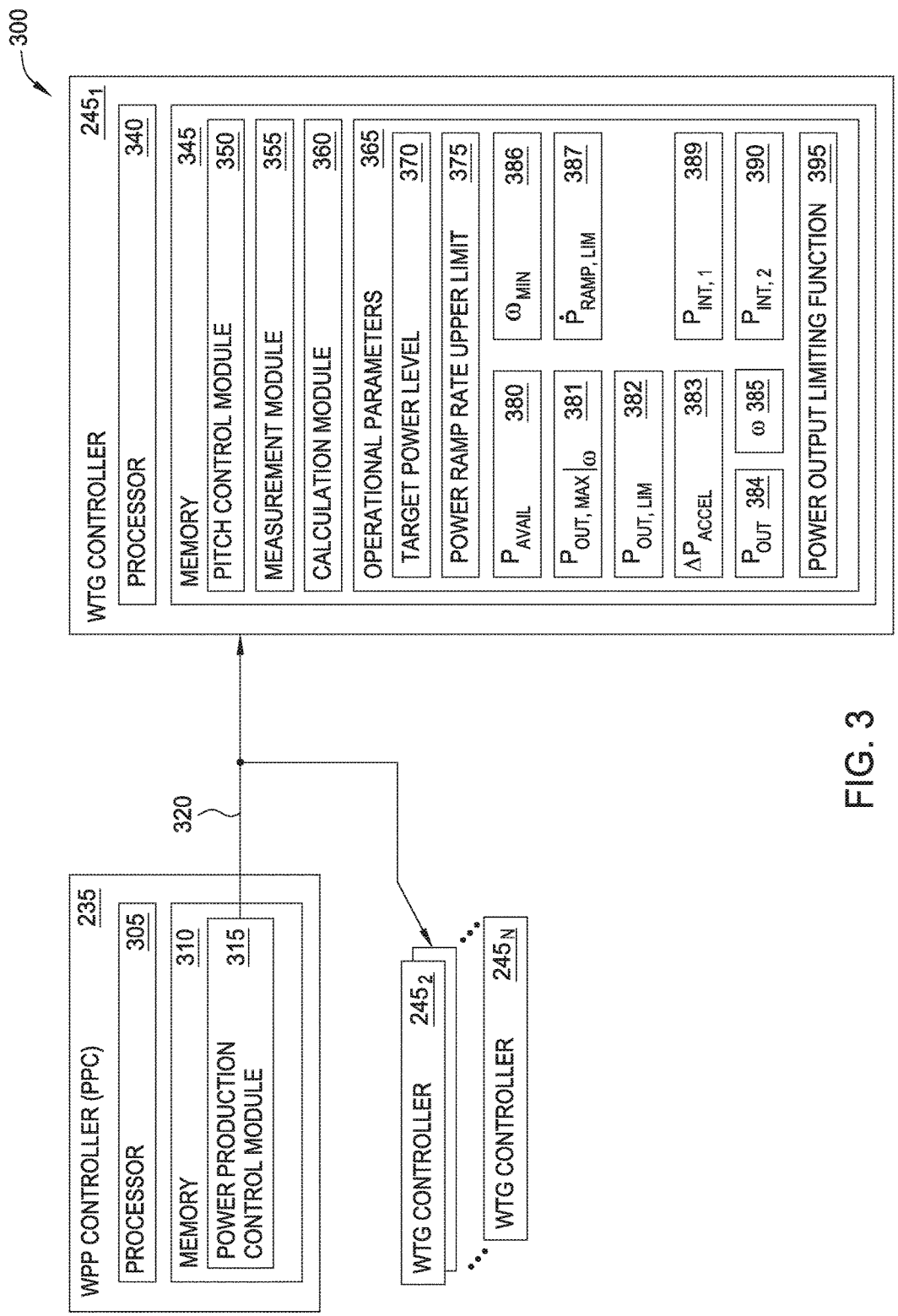
FIG. 3 is a block diagram illustrating a control arrangement for a wind power plant comprising a plurality of wind turbines, according to one embodiment.

FIG. 3 is a block diagram illustrating a control arrangement for a wind power plant comprising a plurality of wind turbines, according to one embodiment. The control arrangement 300 is generally disposed at the wind power plant 205 (FIG. 2), and may be distributed among one or more wind turbines and/or a substation. In another embodiment, one or more components of the control arrangement 300 is disposed remotely (i.e., outside of the geographic area occupied by the wind power plant 205). The wind power plant controller (PPC) 235 is communicatively coupled with a plurality of wind turbine generator (WTG) controllers 245$_1$-$_N$. Each of the WTG controllers 245$_{1\text{-}N}$ (generically or collectively, "controller(s) 245") is coupled with one or more corresponding wind turbine generators that are configured to supply electrical power to an associated electrical grid. While the control arrangement 300 is depicted as having a distributed control implementation, an alternative implementation may consolidate all of the functionality of the control arrangement 300 into a single controller.

The WPP controller (PPC) 235 includes a processor 305 and memory 310. Each of the WTG controllers 245 may include a processor 340 and memory 345. The processors 305, 340 may have any suitable form, such as a general purpose microprocessor, a controller, an application-specific integrated circuit (ASIC), and so forth. Memories 310, 345 may include a variety of computer-readable media selected for their size, relative performance, or other capabilities: volatile and/or non-volatile media, removable and/or non-removable media, etc.

As shown, the wind power plant controller 235 includes a power production control module 315 (or "power production module," "power module"). The WTG controller 245 includes a pitch control module 350, a measurement module 355, and a calculation module 360.

The power module 315 operates to generate set points 320 or other suitable demand signals for controlling the power produced by each of the WTGs in the WPP. The set points 320 correspond to power production for the WTGs from the power that is available in the wind (i.e., based on current wind conditions). The power module 315 generates the set points 320 based on a received or generated WPP-level power demand signal, such as a WPP power output set point, according to any suitable techniques.

The WTG controller 245 includes a pitch control module 350, a measurement module 355, and a calculation module 360. The pitch control module 350 is configured to pitch the blades of the wind turbine into and out of the wind, based on wind conditions and based on set points 320 or other control signals provided by the PPC 235. The rate of adjusting blade pitch generally varies with the power ramp rate of the WTG, and may be limited in some cases for structural reasons.

The measurement module 355 is configured to couple with one or more sensor devices in order to acquire measurements of wind conditions, WTG power production, and/or other WTG operational parameters. For example, the sensor devices may include an anemometer for measuring wind speed at the WTG, voltage and/or current sensors for measuring the output of the WTG, Hall-effect sensors or other magnetic or optical sensors for measuring a rotational speed of the rotor, and so forth. The calculation module 360 is configured to calculate one or more operational parameters 365 for operation of the WTG, based on measurement data acquired by the measurement module 355 and/or based on other values of operational parameters 365.

The WTG controller 245 maintains or stores a number of different operational parameters 365 that are used to control the operation of the WTG. The operational parameters 365 may be updated periodically at one or more update rates. Although not explicitly depicted, additional parameters may be included in the operational parameters 365 for suitably controlling the WTG. Further, certain of the parameters may be included elsewhere in the control arrangement 300, such as in the memory 310 of WPP controller 235 (and communicated to the WTG controller 245). Operational parameters 365 include a target power level 370 for the WTG, which may be based on the set points 320 provided by the WPP controller 235. A corresponding target power level may also be maintained for the WPP power production as a whole. Operational parameters 365 include a power ramp rate upper limit 375, which may represent a default value associated with the WTG or a parameter that is input to the WTG controller 245 or WPP controller 235.

Figure 9:
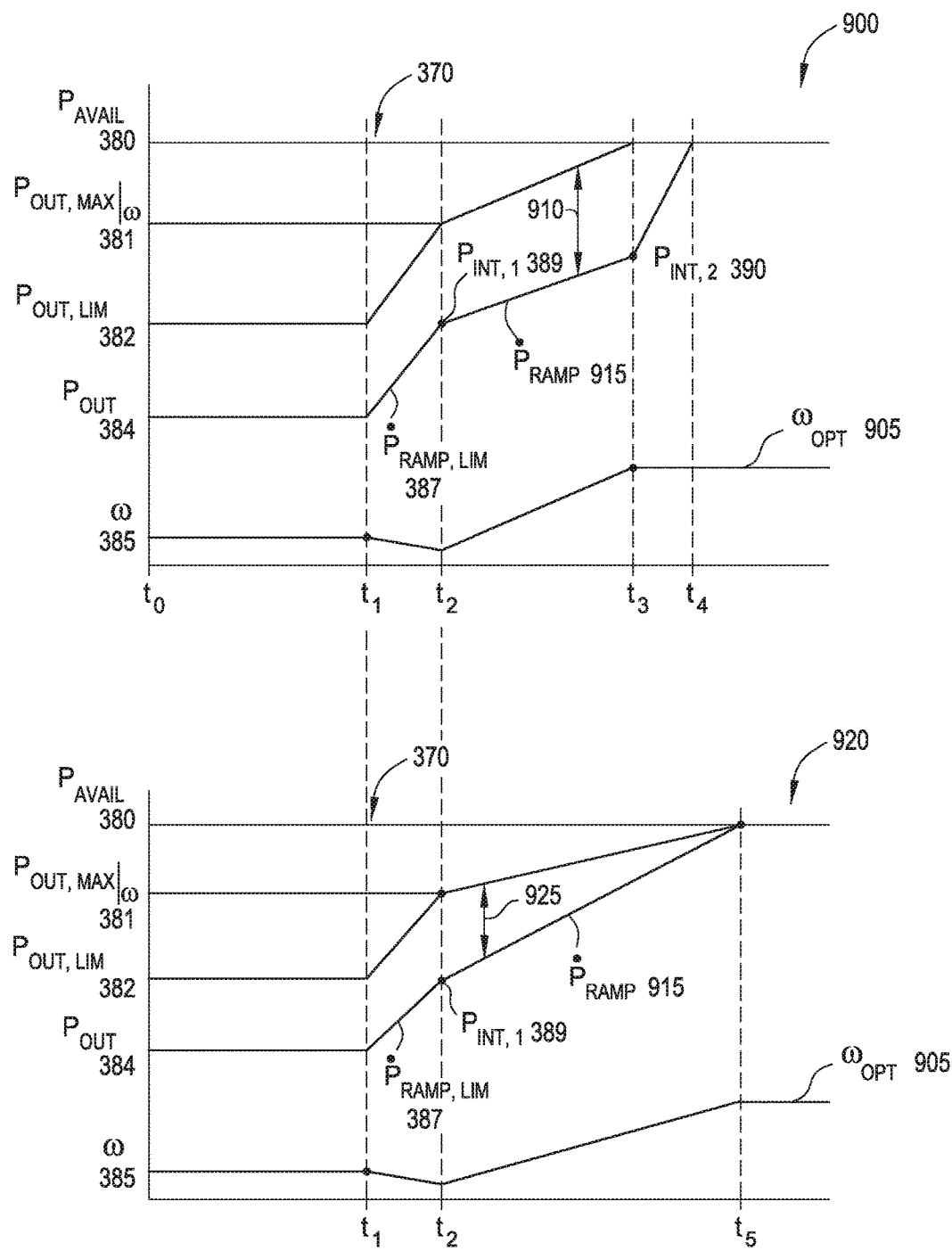
FIG. 9 includes plots illustrating operation of a power output limiting function with an associated predetermined acceleration parameter, according to one embodiment.

Several of the operational parameters 365 will be discussed with respect to both FIGS. 3 and 9. Plot 900 of FIG. 9 represents operation of a WTG using a power output limiting function 395 in which the acceleration parameter $\Delta P_{accel}$ is added to the value of the power output $P_{out}$ 384 without interpolation, and plot 920 represents operation of the WTG using an interpolated acceleration parameter $\Delta P_{accel}$ 383. Each of plots 900, 920 illustrate power ramping of the WTG from an initial power level at time $t_0$ and following receiving a target power level at time $t_1$. In each of plots 900, 920, the target power level 370 is the available power $P_{avail}$ 380, although the target power level 370 may be any suitable alternate constant or time-varying power level. In plot 900, the power output $P_{out}$ 384 of the WTG reaches the target power level at time $t_4$, corresponding to a ramping interval of $(t_4-t_1)$. In plot 920, the power output $P_{out}$ 384 of the WTG reaches the target power level at time $t_5$, corresponding to a longer ramping interval of $(t_5-t_1)$. While the ramping interval of plot 920 is longer than that of plot 900, each of the ramping intervals is generally shorter than the case in which the power output is ramped at a power ramp rate upper limit and the WTG subsequently enters reduced loading operation to recover the rotational speed of the rotor.

The available power $P_{avail}$ 380 represents a calculated maximum power that is available under the current wind conditions, which may be determined or estimated by the calculation module 360 based on measurement data acquired using the measurement module 355. The maximum power for a given rotational speed $P_{out,max}|_\omega$ 381 represents the amount of power that can be produced through blade pitching, without increasing the aerodynamic efficiency of the WTG through increasing rotor speed. The values of $P_{out,max}|_\omega$ 381 may also be calculated by the calculation module 360, and may be calculated such that the WTG does not enter reduced loading operation or otherwise cease power ramping during the ramping interval.

The limited power output $P_{out,lim}$ 382 is a signal indicating when the power ramp rate will be limited from the power ramp rate upper limit 375. Generally, at least some of the energy that is conserved by ramping the power output of the WTG at a reduced power ramp rate is used to contemporaneously increase the rotor speed, thereby increasing the aerodynamic efficiency of the WTG and ensuring that the power output continues to approach the target power level 370 without entering reduced loading operation. Values of the limited power output $P_{out,lim}$ 382 may be calculated by the calculation module 360 based on a predetermined power output limiting function 395. The power output limiting function 395 may be based on a number of different operational parameters 365, such as values of power output $P_{out}$ 384 and $P_{out,max}|_\omega$ 381. The power ramp rate defined by the power output limiting function 395 may further be based on a predetermined acceleration parameter $\Delta P_{accel}$ 383, which may be a default value or other value that is input to the WTG controller 245. In one embodiment (e.g., plot 900), the power output limiting function 395 comprises a sum of the current value of the power output $P_{out}$ 384 and a term including the predetermined acceleration parameter $\Delta P_{accel}$ 383, such as:

$$P_{out,lim} = P_{out} + \Delta P_{accel} \quad (2)$$

In one embodiment (e.g., plot 920), the term comprises the predetermined acceleration parameter multiplied by an interpolation term based on a value of available power and a maximum power output value for a current rotor speed, such as:

$$P_{out,lim} = P_{out} + \Delta P_{accel} \left[ \frac{P_{avail} - P_{out,max}|_\omega}{P_{avail}} \right] \quad (3)$$

Other suitable equations for the power output limiting function 395 are possible.

The power output $P_{out}$ 384 represents a determined current power production of the WTG based on measurements performed by the measurement module 355. The rotor speed ω 385 represents a determined current rotor speed of the WTG based on measurements performed by the measurement module 355. Following receipt of a new target power level at time $t_1$, the power output $P_{out}$ 384 is ramped up by adjusting blade pitch toward an optimal angle for the initial value of rotor speed ω 385. The power output $P_{out}$ 384 is increased at a predetermined second power ramp rate $\dot{P}_{ramp,lim}$ 387, which in some cases is the power ramp rate upper limit 375 for the WTG. The rotor speed ω 385 generally decreases between times $t_1$ and $t_2$.

At time $t_2$, the power output $P_{out}$ 384 reaches a predetermined first intermediate power value $P_{int,1}$ 389, which represents the value of power output $P_{out}$ 384 for which the corresponding value of the limited power output $P_{out,lim}$ 382 (i.e., related by the power output limiting function 395) equals the maximum power for a given rotational speed $P_{out,max}|_\omega$ 381. In this case, the power ramp rate is reduced for values of power output $P_{out}$ 384 that are greater than the first intermediate power value $P_{int,1}$ 389, so that a sufficient margin remains to ramp up the rotor speed ω 385 contemporaneously with power ramping. Operating with a reduced power ramp rate generally occurs during a first portion of the ramping interval. In plot 900, power output $P_{out}$ 384 and rotor speed ω 385 are contemporaneously ramped between times $t_2$ and $t_3$ (i.e., a first portion of the ramping interval $t_4-t_1$); in plot 920, the contemporaneous ramping occurs between times $t_2$ and $t_5$ (i.e., a first portion of the ramping interval $t_5-t_1$). In many cases, the rotor speed ω 385 does not increase at an entirely constant rate, but includes relatively minor variations based on other operational conditions (e.g., wind speed). The power output $P_{out}$ 384 is ramped at a first power ramp rate $\dot{P}_{ramp}$ 915. In some embodiments, the first power ramp rate $\dot{P}_{ramp}$ 915 represents a time-varying rate that is based on the rotor speed 385. As the ramp rate of rotor speed 385 may include some variation, the power ramp rate $\dot{P}_{ramp}$ 915 can likewise represent a substantially continuous function instead of a single rate value.

In some cases, values of the power ramp rates 387, 915 can be used to control operation of the WTG. For example, values of the power ramp rate 915 can be calculated by the calculation module 360 and used with predetermined power ramp rate 387 to calculate the acceleration parameter $\Delta P_{accel}$ 383 and/or other terms of the power output limiting function 395. In some embodiments, the power output limiting function 395 may include values of the power ramp rates 387, 915 as explicit terms for calculating values of the limited power output $P_{out,lim}$ 382.

In some embodiments, the calculation module 360 determines a minimum rotor speed value $\omega_{min}$ 386 needed for the WTG to meet the target power level 370. The minimum rotor speed value $\omega_{min}$ 386 is based on measurements of current wind conditions (e.g., determined using the measurement module 355) and corresponds to an optimal blade pitch for the WTG. As shown in plots 900, 920, the minimum rotor speed value $\omega_{min}$ 386 needed to meet the target power level 370 (i.e., the available power $P_{avail}$ 380) corresponds to an optimal rotor speed value $\omega_{opt}$ 905; in other embodiments, the value of minimum rotor speed value $\omega_{min}$ 386 is less than the optimal rotor speed value $\omega_{opt}$ 905.

Beginning at time $t_2$ in plots 900, 920, the rotor speed ω 385 is ramped up toward the optimal rotor speed value $\omega_{opt}$ 905, which improves the aerodynamic efficiency of the WTG and increases the value of $P_{out,max}|_\omega$ 381 at a corresponding rate. In plot 920—using an interpolated value with acceleration parameter $\Delta P_{accel}$ 383—the first power ramp rate $\dot{P}_{ramp}$ 915 is generally greater than the rate of increase of $P_{out,max}|_\omega$ 381, and the difference 925 between the two signals gradually decreases until time $t_5$. In plot 920, the rotor speed ω 385 reaches the optimal rotor speed value $\omega_{opt}$ 905 at approximately the same time (i.e., time $t_5$) that the power output $P_{out}$ 384 reaches the target power level 370. The power output $P_{out}$ 384 generally follows the target power level 370 from time $t_5$ until a new target power level is received.

In plot 900, where the acceleration parameter $\Delta P_{accel}$ 383 is not interpolated, and the first power ramp rate $\dot{P}_{ramp}$ 915 is approximately equal to the rate of increase of $P_{out,max}|_\omega$ 381, such that the difference 910 between the two signals remains approximately constant until time $t_3$. Because the first power ramp rate $\dot{P}_{ramp}$ 915 is less for plot 900 than for plot 920, more energy from the WTG is reserved and therefore available to increase the rotor speed ω 385, and as a result the rotor speed ω 385 reaches the optimal rotor speed value $\omega_{opt}$ 905 earlier in plot 900 (i.e., time $t_3$ instead of time $t_5$). The value of power output $P_{out}$ 384 at time $t_3$ is a predetermined second intermediate power value $P_{int,2}$ 390. After reaching the optimal rotor speed value $\omega_{opt}$ 905 at time $t_3$, the rotor speed ω 385 need not be increased further, and the power output $P_{out}$ 384 may be ramped from the second intermediate power value $P_{int,2}$ 390 to the target power value 370 at a power ramp rate that is greater than the (reduced) first power ramp rate $\dot{P}_{ramp}$ 915. In some embodiments, the power ramp rate between times $t_3$ and $t_4$ is the second power ramp rate $\dot{P}_{ramp,lim}$ 387, e.g., the power ramp rate upper limit 375 for the WTG. The power output $P_{out}$ 384 generally follows the target power level 370 from time $t_4$ until a new target power level is received.

Figure 4:
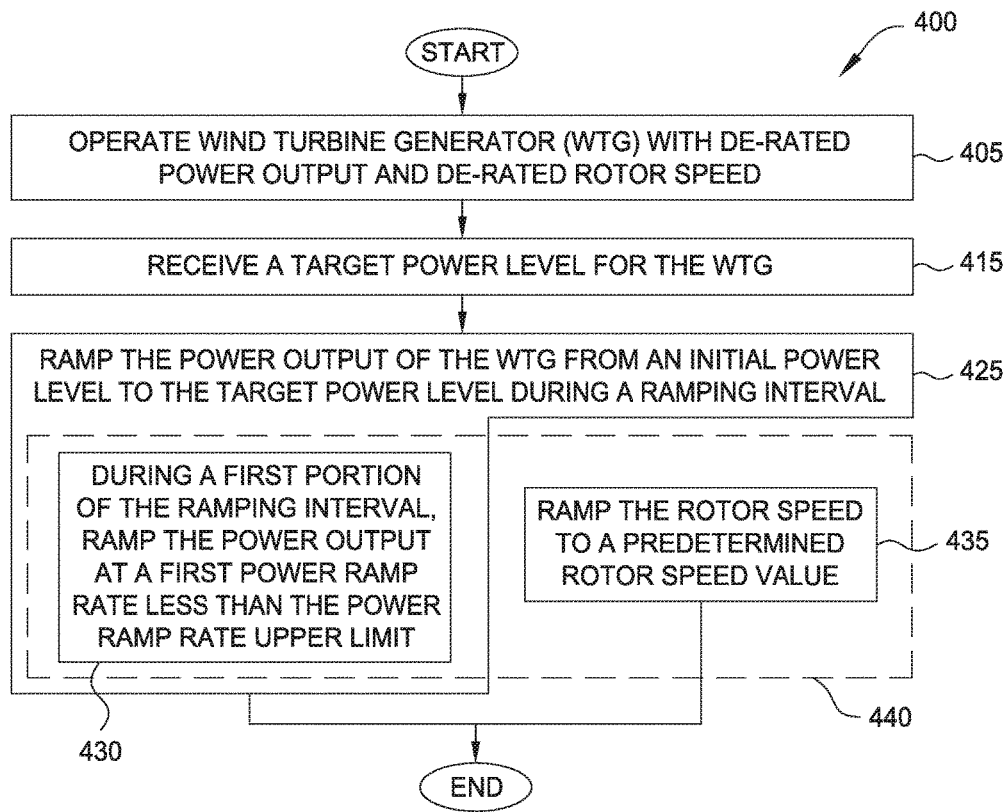
FIG. 4 is a method of controlling a de-rated power output of a wind turbine generator, according to one embodiment.

FIG. 4 is a method of controlling a de-rated power output of a wind turbine generator, according to one embodiment. Method 400 begins at block 405, where the WTG is operated with a de-rated power output and a de-rated rotor speed. In some embodiments, the WTG is operated in a low power operation mode, which may be as low as conditions permit (e.g., wind conditions, stresses on structural components, etc.).

At block 415, the WTG controller receives a target power level. The target power level in some cases may include a power ramp rate for the WTG, or the power ramp rate may be inferred by the WTG controller. For example, a WTG controller may by default ramp power at a maximum possible rate (i.e. a power ramp rate upper limit).

At block 425, the WTG controller ramps the power output of the WTG from an initial power level to the target power level during a ramping interval. At block 430, and during a first portion within the ramping interval, the WTG controller ramps the power output at a first power ramp rate that is less than the power ramp rate upper limit. During the first period—and contemporaneously with block 430 (indicated by the dashed line 440) at block 435 the WTG ramps the rotor speed to a predetermined rotor speed value. At least part of the energy that is conserved by ramping power at a reduced power ramp rate is used to ramp the rotor speed, without the WTG producing a negative power output or entering reduced loading operation. Method 400 ends following completion of block 425.

Figure 5:
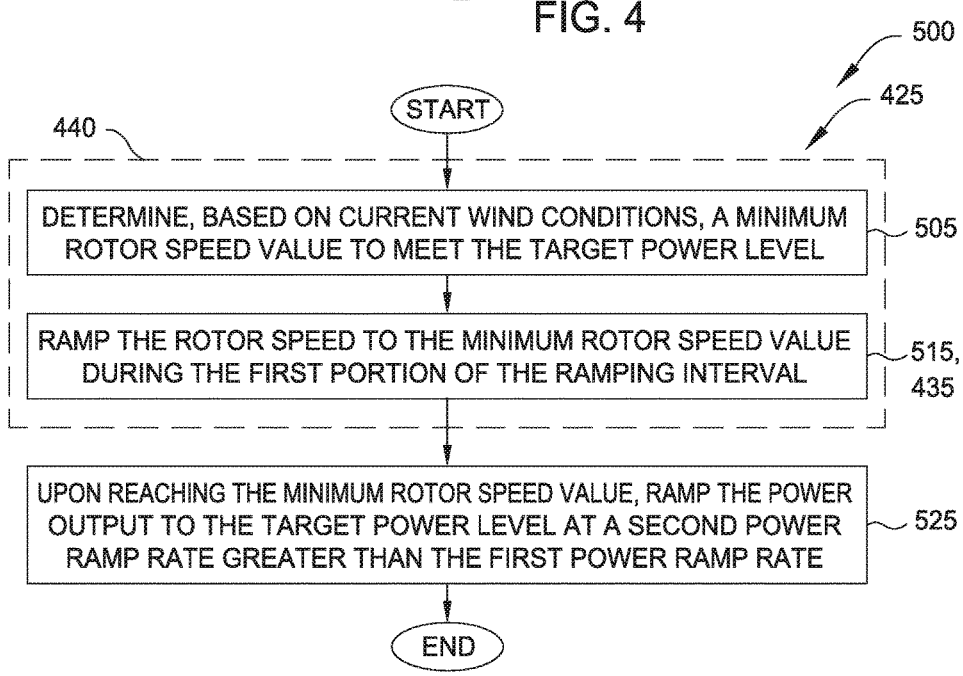
FIG. 5 is a method of ramping a rotor speed of a wind turbine generator contemporaneously with ramping the power output of the wind turbine generator, according to one embodiment.

FIG. 5 is a method of ramping the rotor speed of a WTG contemporaneously with ramping the power output of the WTG, according to one embodiment. Generally, method 500 corresponds to block 425 of method 400. Method 500 begins at block 505, where the WTG controller determines a minimum rotor speed value to meet the target power level. The determined minimum rotor speed value is based on current wind conditions at the WTG, which may be measured using the WTG controller.

At block 515, the WTG controller ramps the rotor speed to the minimum rotor speed value during the first portion of the ramping interval. Block 515 generally corresponds to block 435 of method 400, in which the minimum rotor speed value corresponds to the predetermined rotor speed value.

At block 525, and upon reaching the minimum rotor speed value, the WTG controller ramps the power output to the target power level. The ramping is done at a second power ramp rate greater than the first power ramp rate. In some cases, the second power ramp rate corresponds to the power ramp rate upper limit. Method 500 ends following completion of block 525.

Figure 6:
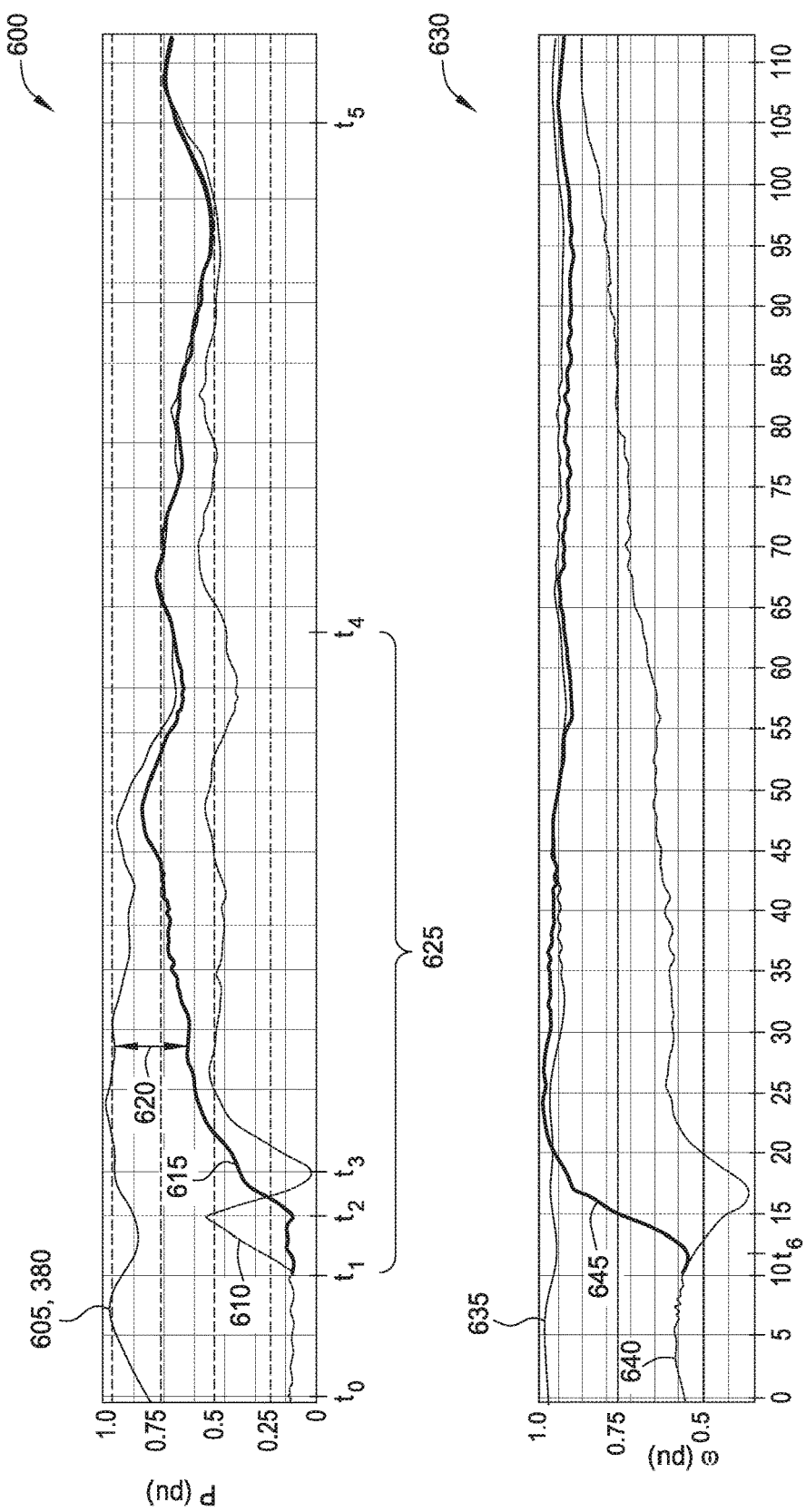
FIG. 6 includes plots illustrating operation of a wind turbine generator with and without contemporaneous ramping of the rotor speed with the power output, according to one embodiment.

FIG. 6 includes plots illustrating operation of a WTG with and without contemporaneous ramping of the rotor speed with the power output, according to one embodiment. Plot 600 depicts various power output levels of a WTG, and plot 630 depicts corresponding rotor speed levels. Generally, signals 605 and 635 reflect optimal power generation corresponding to the WTG producing available power $P_{avail}$ 380 based on the current wind conditions. The value of signal 605 at time $t_0$ is approximately 0.8 per-unit (pu) of the rated power, but generally varies based on the particular WTG configuration and wind conditions over time. For example, assume that the depicted WTG is rated to produce 1 pu at a 1 pu rotor speed. Any suitable rating values are possible for the WTG, such as 3500 kilowatts (kW) at 1400 rotations per minute (rpm).

Signals 610 and 615 each represent the power output of a WTG operating with a de-rated power output and a de-rated rotor speed. As shown, at time $t_0$, the power output is approximately 0.12 pu (or 12% of the rated power output). Signals 640 and 645, which respectively correspond to signals 610 and 615, illustrate a starting de-rated rotor speed of about 0.6 pu.

The signal 610 corresponds to a WTG that ramps power according to a "normal" power ramping scheme—that is, upon receiving the target power level at time $t_1$ (about t=10 seconds), ramping the power output fast by pitching the blades irrespective of whether the starting rotor speed of the WTG can support the target power level. As a result, signal 610 shows ramping the power output at a maximum power ramp rate between times $t_1$ and $t_2$ (about t=15 seconds). Correspondingly, the rotor speed in signal 640 decreases gradually as the power output is ramped up. However, at time $t_2$, the WTG reaches its aerodynamic efficiency limits and is not able to produce power beyond about 0.5 pu due to limitations of the starting rotor speed value. The power output of signal 610 decreases between times $t_2$ and $t_3$ as the WTG controller attempts to restore the rotational speed. Signal 610 reaches the target power level at time $t_5$, corresponding to a ramping interval of about 100 seconds after the target power level is received.

Signal 615 corresponds to a WTG that ramps power contemporaneously with rotor speed ramping techniques according to various embodiments described herein. As shown, the WTG receives the target power level at time $t_1$. Instead of performing an immediate power ramping as with signal 610, the WTG controller determines a minimum rotor speed value if the target power level cannot be met with the starting rotational speed value. The minimum rotor speed value is determined based at least partly on the current wind conditions. During this period of rotor speed ramping, the power ramp rate is less than the power ramp rate upper limit of the WTG, and as shown is approximately zero between $t_1$ and $t_2$. In alternate embodiments, the WTG controller ramps the power during the period of rotor speed ramping with at least a nominal power ramp rate.

After the rotor speed ramping begins at time $t_6$ (signal 645), signal 615 shows that the power output of the WTG is also ramped up beginning at about time $t_2$. In some embodiments, the power output ramping commences after the rotor speed has reached a predetermined rotor speed value such as a determined minimum rotor speed value to meet the target power level. In some embodiments, power output ramping begins prior to the rotor speed reaching the predetermined value, but the power ramp rate remains sufficiently low to direct energy to rotor speed ramping. For example, the power ramp rate may transition gradually from a near-zero rate to the power ramp rate upper limit. The signal 615 continues to approach the signal 605 during ramping interval 625 (corresponding to $t_4$-$t_1$). In fact, a difference 620 between signals 615 and 605 is at least monotonically decreasing during the entire ramping interval 625. For some time-varying target power levels such as available power 380, a negative change in the power level may result in a corresponding negative change to the signal 615, but the difference 620 continues to decrease. Signal 615 reaches the target power level at time $t_4$, corresponding to a ramping interval 625 of about fifty (50) seconds after the target power level is received.

Figure 7:
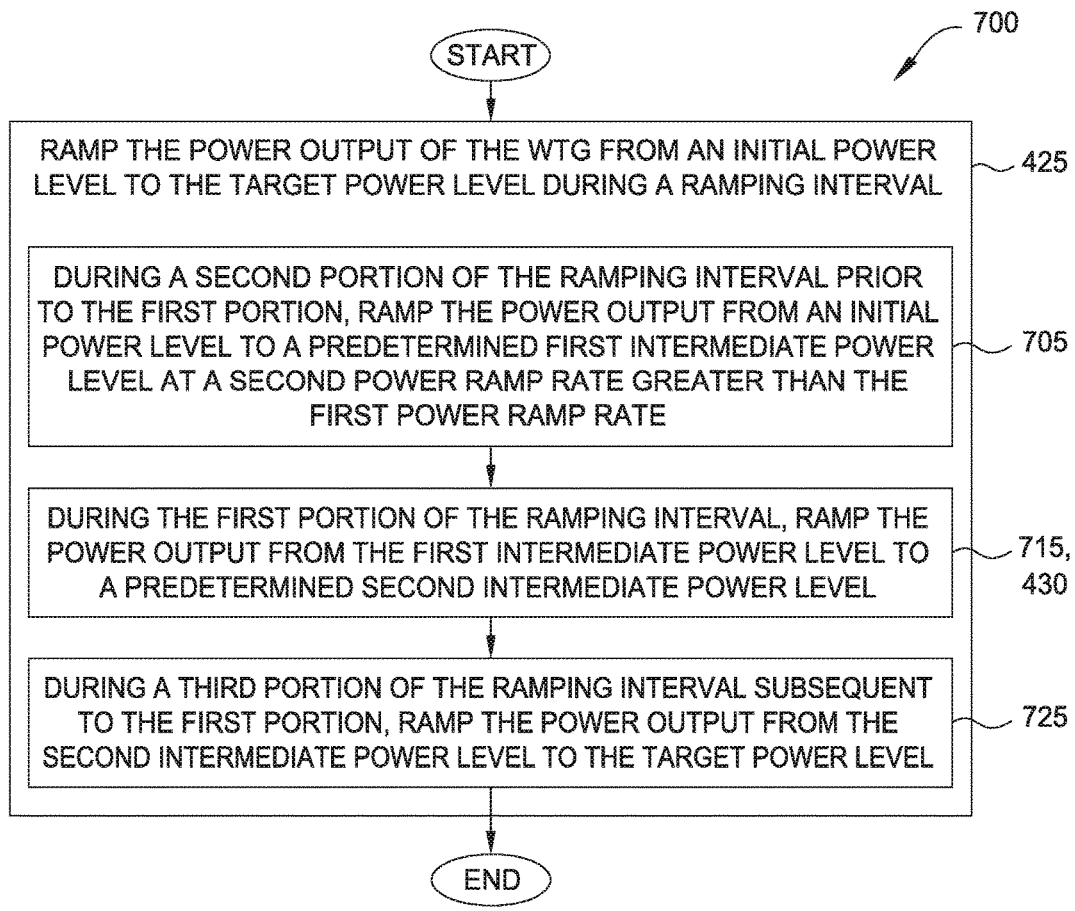
FIG. 7 is a method of ramping a power output of a wind turbine generator from an initial power level to a target power level during a ramping interval, according to one embodiment.

FIG. 7 is a method of ramping a power output of a wind turbine generator from an initial power level to a target power level during a ramping interval, according to one embodiment. Method 700 generally corresponds to block 425 of method 400. At block 705, and during a second portion of the ramping interval prior to the first portion, the WTG controller ramps the power output from an initial power level to a predetermined first intermediate power level at a second power ramp rate greater than the first power ramp rate. In some embodiments, the second power ramp rate is the power ramp rate upper limit for the WTG. In some embodiments, the first intermediate power level represents the value of power output for which the corresponding value of a power output limiting function equals the maximum power for a given rotational speed.

At block 715, which corresponds to block 430 of method 400, and during the first portion of the ramping interval, the WTG controller ramps the power output form the first intermediate power level to a predetermined second intermediate power level. In some embodiments, the second intermediate power level corresponds to the rotational speed reaching an optimal rotor speed value.

At block 725, and during a third portion of the ramping interval subsequent to the first portion, the WTG controller ramps the power output from the second intermediate power level to the target power level. In some cases, the power ramp rate during the third portion is the power ramp rate upper limit. Method 700 ends following block 725.

Figure 8:
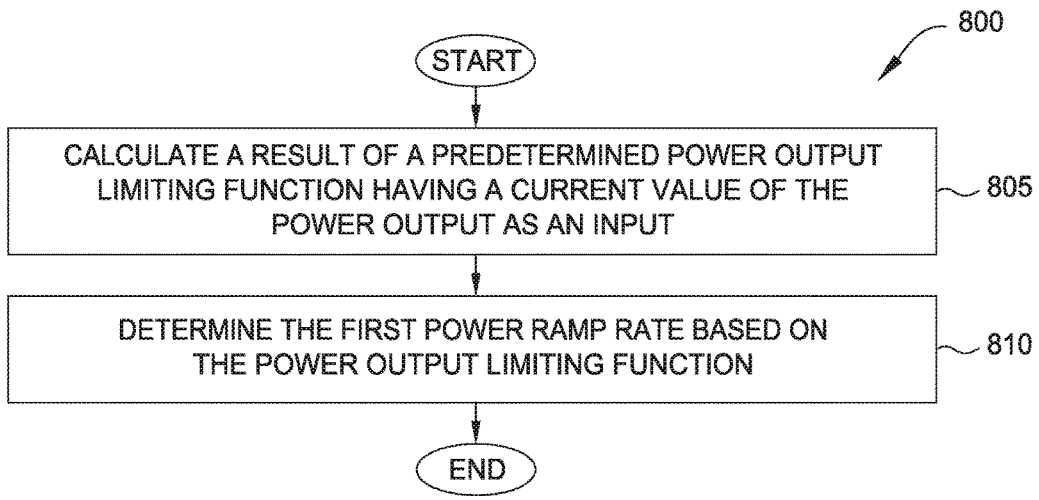
FIG. 8 is a method of determining a first power ramp rate to be applied by a wind turbine generator during a contemporaneous ramping of rotor speed, according to one embodiment.

FIG. 8 is a method of determining a first power ramp rate to be applied by a wind turbine generator during a contemporaneous ramping of rotor speed, according to one embodiment. Method 800 may be used as part of method 400 (e.g., block 430) or method 700 (e.g., block 715).

Method 800 begins at block 805, where the WTG controller calculates a result of a predetermined power output limiting function having a current value of the power output as an input. The power limiting function may be any suitable function to ensure a margin of energy is reserved to support the contemporaneous ramping of the rotor speed during the power ramping interval. In this way, the WTG continues to increase the power toward the target power level without needing to enter reduced loading operation to recover the rotor speed before reaching the target power level.

At block 810, the first power ramp rate is determined based on the power output limiting function. In some embodiments, the power ramp rate is based on a predetermined acceleration parameter. In some cases, the power ramp rate is approximately the same as the rate of increase in maximum power made available due to the ramping of rotational speed during the first portion of the ramping interval. In some cases, the power ramp rate is greater than the rate of increase in maximum power. Method 800 ends following completion of block 810.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method of controlling a de-rated power output of a wind turbine generator, the wind turbine generator associated with a predetermined power ramp rate upper limit and operating with a de-rated rotor speed, the method comprising:

ramping, upon receiving a target power level, the power output from an initial power level to the target power level during a ramping interval, wherein during a first portion of the ramping interval, the power output is ramped at a first power ramp rate less than the power ramp rate upper limit;

ramping the rotor speed to a predetermined rotor speed value contemporaneously with ramping the power output during the first portion of the ramping interval; and calculating a result of a predetermined power output limiting function having a current value of the power output as an input, the power output limiting function selected to support the contemporaneous ramping of rotor speed during the first portion of the ramping interval, wherein the first power ramp rate is determined based on the power output limiting function.

2. The method of claim 1, wherein the first power ramp rate determined based on the power output limiting function avoids causing the wind turbine generator to enter reduced loading operation.

3. The method of claim 1, further comprising:
determining, based on current wind conditions, a minimum rotor speed value to meet the target power level, wherein the predetermined rotor speed value is the determined minimum rotor speed value;
ramping the rotor speed to the minimum rotor speed value during the first portion of the ramping interval; and
upon reaching the minimum rotor speed value, ramping the power output to the target power level at a second power ramp rate greater than the first power ramp rate.

4. The method of claim 3, wherein the first power ramp rate is substantially zero, and wherein the second power ramp rate is the power ramp rate upper limit.

5. The method of claim 1, further comprising:
ramping, during a second portion of the ramping interval prior to the first portion, the power output from the initial power level to a predetermined first intermediate power level at a second power ramp rate greater than the first power ramp rate.

6. The method of claim 5, wherein the power output is ramped from the first intermediate to a predetermined second intermediate power level during the first portion of the ramping interval, the method further comprising:
ramping, during a third portion of the ramping interval subsequent to the first portion, the power output from the second intermediate power level to the target power level.

7. The method of claim 6, wherein the first intermediate power level corresponds to a maximum power output value for the wind turbine generator at a current rotor speed, and wherein the second intermediate power level corresponds to a predetermined optimal rotor speed based on current wind conditions.

8. The method of claim 1, wherein the power output limiting function comprises a sum of the current value of the power output and a term including a predetermined acceleration parameter.

9. The method of claim 8, wherein the term comprises the predetermined acceleration parameter multiplied by an interpolation term based on a value of available power and a maximum power output value for a current rotor speed.

10. A control arrangement for controlling a de-rated power output of a wind turbine generator (WTG), the WTG associated with a predetermined power ramp rate upper limit and operating with a de-rated rotor speed, the control arrangement comprising:
a processor coupled with a pitch control module and a calculation module, and configured to:
ramp, using the pitch control module and in response to receiving a target power level, the power output from an initial power level to the target power level during a ramping interval, wherein during a first portion of the ramping interval, the power output is ramped at a first power ramp rate less than the power ramp rate upper limit; and
ramp the rotor speed to a predetermined rotor speed value contemporaneously with ramping the power output during the first portion of the ramping interval,
wherein the calculation module is configured to calculate a result of a predetermined power output limiting function having a current value of the power output as an input, the power output limiting function selected to support the contemporaneous ramping of rotor speed during the first portion of the ramping interval; and
determine the first power ramp rate based on the power output limiting function.

11. The control arrangement of claim 10, wherein the calculation module is configured to determine the first power ramp rate based on the power output limiting function to avoid causing the WTG to enter reduced loading operation.

12. The control arrangement of claim 10, further comprising a measurement module configured to acquire current wind condition data for the WTG,
wherein the processor is further configured to:
determine, based on the current wind condition data, a minimum rotor speed value to meet the target power level, wherein the predetermined rotor speed value is the determined minimum rotor speed value;
ramp the rotor speed to the minimum rotor speed value during the first portion of the ramping interval; and
upon reaching the minimum rotor speed value, ramping the power output to the target power level at a second power ramp rate greater than the first power ramp rate.

13. The control arrangement of claim 10, wherein the processor is further configured to:
ramp, during a second portion of the ramping interval prior to the first portion, the power output from the initial power level to a predetermined first intermediate power level at a second power ramp rate greater than the first power ramp rate.

14. The control arrangement of claim 13, wherein the processor is further configured to:
ramp the power output from the first intermediate to a predetermined second intermediate power level during the first portion of the ramping interval; and
ramp, during a third portion of the ramping interval subsequent to the first portion, the power output from the second intermediate power level to the target power level.

* * * * *